United States Patent
Martin et al.

(10) Patent No.: US 10,700,915 B2
(45) Date of Patent: Jun. 30, 2020

(54) METHOD FOR STREAMING AN AUDIO VIDEO CONTENT

(71) Applicant: BROADPEAK, Cesson Sevigne (FR)

(72) Inventors: Jean-François Martin, Cesson Sevigne (FR); Jérémy Desmauts, Cesson Sevigne (FR); Jacques Le Mancq, Cesson Sevigne (FR)

(73) Assignee: BROADPEAK, Cesson Sevigne (FR)

( * ) Notice: Subject to any disclaimer, the term of this patent is extended or adjusted under 35 U.S.C. 154(b) by 0 days.

(21) Appl. No.: 16/259,376

(22) Filed: Jan. 28, 2019

(65) Prior Publication Data
US 2019/0238390 A1 Aug. 1, 2019

(30) Foreign Application Priority Data
Feb. 1, 2018 (EP) .................................... 18305104

(51) Int. Cl.
*G06F 15/16* (2006.01)
*H04L 29/06* (2006.01)
(Continued)

(52) U.S. Cl.
CPC .. *H04L 29/06462* (2013.01); *H04L 29/06523* (2013.01); *H04L 65/4084* (2013.01); (Continued)

(58) Field of Classification Search
CPC ......... H04L 29/06462; H04L 29/06523; H04L 65/4084; H04L 65/4092; H04L 65/607; (Continued)

(56) References Cited

U.S. PATENT DOCUMENTS 9,246,965 B1 * 1/2016 Stoica ..................... H04L 65/80
9,613,042 B1 * 4/2017 Joseph ..................... G06F 16/16
(Continued)

OTHER PUBLICATIONS

Jun. 22, 2018 Search Report issued in European Patent Application No. 18305104.4.

*Primary Examiner* — Philip B Tran
(74) *Attorney, Agent, or Firm* — Oliff PLC; R. Brian Drozd (57) ABSTRACT

This document describes an adaptive bitrate streaming method allowing streaming an audio video (AV) content to a client device using a multi content delivery network (CDN) approach. Each CDN stores multiple versions of a content that can be requested in the form of a succession of consecutive files using HTTP requests. The method is based on a use of an intermediate module, called diversity module, between an AV player of the client device and each CDN of a plurality of CDN. For each file of a version of a content requested by the AV player, the diversity module requests a manifest file to each CDN and estimates a bitrate of each CDN using reception performances of the manifest files. Each file is requested by the diversity module in the form of a succession of groups of segments structured according to a pattern comprising a predetermined number of segments. Each group comprises one set of segments for each CDN, each set comprising a number of segments intended to be requested to the CDN to which they correspond proportional to the bitrate of this CDN.

8 Claims, 4 Drawing Sheets

(51) Int. Cl.
  *H04N 21/2343* (2011.01)
  *H04L 29/08* (2006.01)
  *H04N 21/6373* (2011.01)
  *H04N 21/442* (2011.01)
  *H04N 21/63* (2011.01)

(52) U.S. Cl.
  CPC ........ *H04L 65/4092* (2013.01); *H04L 65/607* (2013.01); *H04L 67/02* (2013.01); *H04L 67/1097* (2013.01); *H04N 21/23439* (2013.01); *H04N 21/44209* (2013.01); *H04N 21/631* (2013.01); *H04N 21/6373* (2013.01)

(58) Field of Classification Search
  CPC ................ H04L 67/02; H04L 67/1097; H04N 21/23439; H04N 21/44209; H04N 21/631; H04N 21/6373
  See application file for complete search history.

(56) References Cited

U.S. PATENT DOCUMENTS

| | | |
|---|---|---|
| 2012/0311174 A1 | 12/2012 | Bichot et al. |
| 2016/0248835 A1* | 8/2016 | Petrangeli ............. H04L 65/608 |
| 2017/0126256 A1* | 5/2017 | Salomons .......... H04N 21/4825 |
| 2017/0290036 A1* | 10/2017 | Han ................. H04W 72/1215 |
| 2017/0311209 A1* | 10/2017 | Begen ............... H04W 36/0022 |
| 2018/0241836 A1* | 8/2018 | Arsenault ........... H04L 67/2847 |

* cited by examiner

METHOD FOR STREAMING AN AUDIO VIDEO CONTENT

FIELD OF THE INVENTION

The present invention concerns a method for streaming an audio video content to a client device and a device implementing said method.

BACKGROUND OF THE INVENTION

Today's video streaming technologies are almost exclusively based on the HTTP ("HyperText Transfer Protocol", RFC 2616) protocol and designed to work efficiently over large and distributed HTTP networks such as the Internet. HTTP-based streaming technologies are very convenient, as HTTP allows going through firewalls and guarantees data integrity by relying on TCP ("Transmission Control Protocol", RFC 793).

Adaptive BitRate (ABR) is one popular HTTP based streaming technique used in streaming contents over computer networks. HLS ("HTTP Live Streaming"), which is a video streaming communications protocol based on HTTP and developed by Apple Inc., is one particular implementation of ABR. HLS works by breaking an overall AV ("Audio/Video") content into a sequence of small HTTP-based file downloads. Each file contains one chunk of an overall potentially unbounded transport stream. The AV content is thus divided into chunks, wherein a chunk is a portion of the AV content.

As the AV content is played, a client device decoding the AV content may select from a plurality of different alternate versions (or layers) containing the same material encoded at various respective bitrates, a version adapted to available network resources and/or available processing resources of the client device. At the start of the streaming session, the client device downloads a playlist in the form of a text file (or manifest file) with an M3U, m3u8, ISM, ISML, or MPD file extension. This manifest file contains metadata describing the plurality of versions.

A similar ABR approach is implemented by Smooth Streaming, which is a feature of Internet Information Services (IIS) Media Services, an integrated HTTP-based media delivery platform provided by Microsoft Corp. Contrary to HLS wherein the AV stream is truncated in plural files containing chunks complemented with playlist files, Smooth Streaming relies on a single AV stream truncated into pieces, each piece of stream containing a descriptor indicating the concerned layer and a reference time in the AV stream.

One may similarly consider Adobe Systems' HTTP Dynamic Streaming (HDS) and Dynamic Adaptive Streaming over HTTP, a multimedia streaming technology developed by the Moving Picture Experts Group (MPEG), and referred to as MPEG DASH.

While ABR works very well over the Open Internet on any type of device, the connected nature of the HTTP protocol over a non-managed network creates some Quality of Experience (QoE) issues for users of OTT (Over-the Top) video service. This is mainly due to the fact that OTT service platforms rely on one single Content Delivery Network (CDN) platform (called just "CDN" in the following) to deliver an HTTP AV content. As a reminder, a CDN is constituted of computers interconnected by the Internet and cooperating to deliver contents to users. More precisely, a CDN is constituted of original servers from which contents are injected in the CDN for replication, peripheral servers geographically spread over the network in which the contents of the original servers are replicated, and routing mechanisms allowing a user request for a content to be computed by the closest server. It is known however that relying on one CDN may create some issues such as scalability issues due to high numbers of users, variable performance depending on the user position with respect to the CDN, etc. Using one CDN may create additional issues. For instance, said CDN could stop or the connection to said CDN could be overloaded.

To overcome these issues, multi-CDN approaches have been developed. A multi-CDN approach basically consists in requesting chunks of a same audio/video content to a plurality of CDN. These approaches have at least the advantage of increasing in average the bitrate delivered to the client devices. However, these approaches are known to create some burstiness in the reception of data by AV players in charge of displaying the AV content in the client devices. In other words, data are received in bursts (periods of high bitrate followed by period of low bitrate) instead of being received with a bitrate varying slowly.

ABR AV players implement generally a strategy to maximize the user QoE by assessing different parameters including CPU usage in the client device, screen size, codecs, frame rate or network conditions. Assessing network conditions consists in measuring the bitrate of incoming data in order to select the most adapted layer of the requested AV content that will maximize the AV bitrate (hence the quality) while maintaining a continuous playing of the AV content.

Burstiness may lead to a frequent overestimation or underestimation of the real network conditions. An overestimation results in draining video buffers which may lead to a video stop until buffers are refilled. An underestimation results in playing a suboptimal video profile compared to what could be really achieved. Moreover, frequent over and underestimations lead to a frequent change of the requested layer, and consequently to a bad experience for the user, since the quality of the content it is watching is frequently changing.

Figure 9:
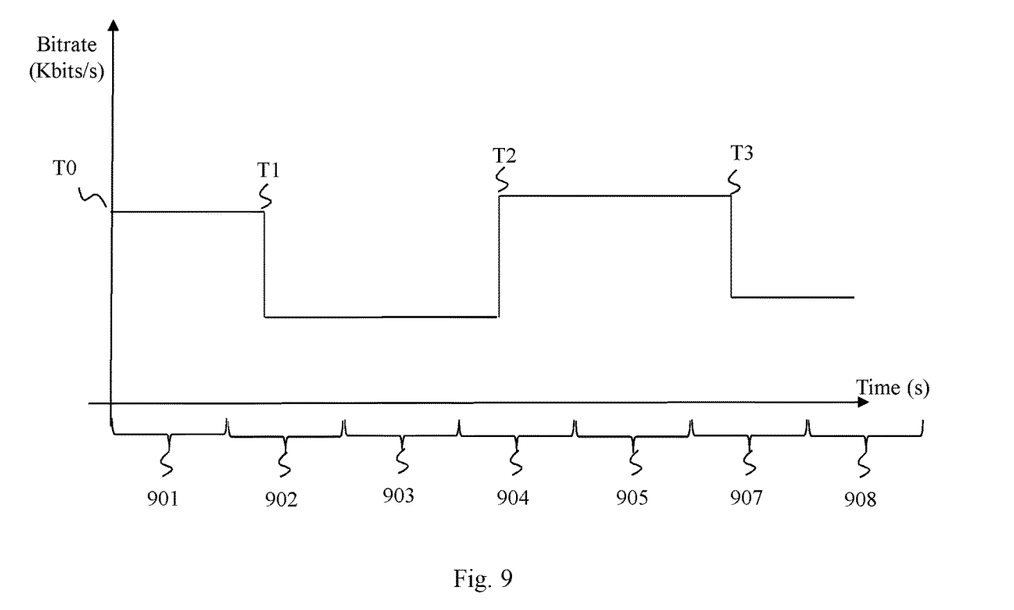

FIG. 9 illustrates an example of estimation of network conditions. FIG. 9 represents the reception bitrate received by an AV player in function of the time, the AV video player receiving data from a plurality of CDN. Successive chunks are requested to the plurality of CDN. For instance, if the plurality comprises three CDN, named CDN1, CDN2, CDN3, the AV player requests chunk "1" to CDN1, chunk "2" CDN 2 and chunk "3" to CDN 3. When the bitrate of each CDN is the same, the AV player receives nearly a constant bitrate. In that case, there is no problem to estimate a bitrate representative of the real reception bitrate of the AV player. But, problems occur when one CDN has a lower bitrate than others.

In the example of FIG. 9, we suppose that the AV player estimates periodically its reception bitrate. In FIG. 9, items 901 to 908 represent periods of estimation of the reception bitrate by the AV player. In FIG. 9, from time T0 to time T1, we have represented a bitrate corresponding to a reception bitrate of a first chunk transmitted by CDN1. From time T1 to time T2, we have represented a bitrate corresponding to a reception bitrate of a second chunk transmitted by CDN 2. From time T2 to time T3, we have represented a bitrate corresponding to a reception bitrate of a third chunk transmitted by CDN 3. During period of estimation 901, the AV player estimates a high bitrate. Since high bitrate has been measured, the AV player decides to request a high profile. But then during period of estimation 902, the reception bitrate decreases and the AV player estimates an average bitrate. Since average bitrate has been measured, the AV player decides to request an average profile. During period of estimation 903, the reception bitrate remains low. Since low bitrate has been measured, the AV player decides to request a low profile. During period of estimation 904, the reception bitrate increases. In reaction to that increase, the AV player requests again an average profile. As can be seen, the AV player is frequently changing the profile it is requesting which is not acceptable for a user. The estimation of the reception bitrate would be more efficient if the AV player has had averaged to bitrates at least from time T0 to time T3. Indeed, in that case, the AV player would average the reception bitrate during this period, which would be more representative of the actual reception bitrate and would prevent the frequent change of the requested profiles.

It is desirable to overcome the above drawbacks of the prior art. It is desirable to provide a method and a device allowing an AV player benefiting of a multi-CDN approach without perturbing the behavior of the AV player and more particularly, preventing the AV player frequently over or underestimating the bitrate available on the network. More globally, it is desirable to provide a method allowing improving the QoE perceived by a user in the context of a multi-connections approach (i.e. Multi-CDN and/or CDN providing multiple connections).

SUMMARY OF THE INVENTION

According to a first aspect of the invention, the invention concerns a method for streaming an audio video content, called content, to a client device comprising an audio video player, called AV player, in charge of decoding said content and capable of determining its operating conditions allowing the AV player determining a version of said content to be requested adapted to said operating conditions in a plurality of versions, said content being stored redundantly on a plurality of content delivery networks, called CDN, from which said content could be requested in the form of a sequence of successive independent files, called chunks, using HTTP requests. The method is implemented by a device interfacing the AV player with the plurality of CDN and comprises: receiving, from the AV player, a request for a first manifest file describing said content; requesting the first manifest file to each CDN; estimating the bitrate of each CDN based on performances of reception of the first manifest file from each CDN and transmitting one of the received first manifest file to the AV player; classifying the CDN in order of decreasing estimated bitrates; defining a subdivision of a default chunk of said content of a predefined chunk size in a succession of groups of segments of a predefined segment size, each group of segments being organized according to a pattern of segments comprising a number of segments depending on a predetermined minimum chunk size and a predetermined number representative of a minimum time the AV player estimates its operating conditions on a chunk, the pattern comprises a set of consecutive segments for each CDN of the plurality of CDN, each set of consecutive segments comprising a number of segments proportional to the bitrate estimated for the CDN to which it corresponds and each segment of each set of consecutive segments being intended to be requested to the CDN to which the set of consecutive segments correspond, the sets of consecutive segments in the pattern being ordered according to the classification of the CDN; intercepting a request from the AV player and if the request concerns a chunk corresponding to a version of the content determined by the AV player using the first manifest file, transmitting a request to each CDN, the request transmitted to a CDN requesting all segments allocated to said CDN as defined in each groups of segments of the default chunk by the pattern; receiving said segments and transmitting them to the AV player as soon as these segments are ordered in their order of appearance in the chunk; re-estimating the bitrate of each CDN based on performances of reception of the segments; resuming the method from the classifying of the CDN while chunks remain to be requested for said content, the classifying being based on the last estimation of the bitrate of each CDN.

Requesting each chunk constituting an AV content to a plurality of CDN in the form of small segments of said chunk, the number of segments requested for a chunk to a CDN depending of the bitrate provided by said CDN, allows obtaining lower and shorter bursts spread over the chunk. Consequently, the estimation of the bitrate by the AV player is less perturbed. The overestimations and the underestimations of the actual bitrate available on the network by the AV player are less frequent. In addition, the method allows reacting faster to variations of the CDN bitrate and even to a shut-down of a CDN.

In an embodiment, during the reception of each chunk, at least one segment of said chunk is analyzed to extract data representative of an actual chunk size of said chunk and, if the actual chunk size is higher than the predefined chunk size, reinitializing the predefined chunk size to the actual chunk size and requesting missing segments corresponding to a part not comprised in the predefined chunk size to the CDN offering the maximum bitrate.

In an embodiment, the analyzed segment is the first received segment for that chunk.

In an embodiment, during the reception of each chunk, at least one segment of said chunk is analyzed to determine if at least one segment has not been received, and if at least one segment has not been received, each missing segment is requested to the available CDN offering the maximum bitrate.

In an embodiment, when the request intercepted by the AV player concerns a second manifest file corresponding to a version of the content determined by the AV player using the first manifest file, transmitting a request to the CDN offering the highest bitrate to obtain said second manifest file, said second manifest file being sent to the AV player when received to allow the AV player requesting at least one new chunk.

In a second aspect of the invention, the invention concerns a device intended to be used in a context of streaming an audio video content, called content, to a client device comprising an audio video player, called AV player, in charge of decoding said content and capable of determining its operating conditions allowing the AV player determining a version of said content to be requested adapted to said operating conditions in a plurality of versions, said content being stored redundantly on a plurality of content delivery networks, called CDN, from which said content could be requested in the form of a sequence of successive independent files, called chunks, using HTTP requests. The device interfaces the AV player with the plurality of CDN and comprises:

reception means for receiving a request for a manifest file describing said content from the AV player; requesting means for requesting the manifest file to each CDN; bitrate estimation means for estimating the bitrate of each CDN based on performances of reception of the manifest files and transmitting one of the received manifest file to the AV player; classification means for classifying the CDN in order of decreasing estimated bitrates; definition means for defining a subdivision of a default chunk of said content of a predefined chunk size in a succession of groups of segments of a predefined segment size, each group of segments being organized according to a pattern of segments comprising a number of segments depending of a predetermined minimum chunk size and a predetermined number representative of a minimum time the AV player estimates its operating conditions on a chunk, the pattern comprises a set of consecutive segments for each CDN of the plurality of CDN, each set of consecutive segments comprising a number of segments proportional to the bitrate estimated for the CDN to which it corresponds and each segment of each set of consecutive segments being intended to be requested to the CDN to which the set of consecutive segments correspond, the sets of consecutive segments in the pattern being ordered according to the classification of the CDN; reception means for intercepting a request from the AV player; transmission means for transmitting a request to each CDN if the intercepted request concerns a chunk corresponding to a version of the content determined by the AV player using the manifest file, the request transmitted to a CDN requesting all segments allocated to said CDN as defined in each group of segments of the default chunk by the pattern; reception means for receiving said segments; transmission means for transmitting the received segments to the AV player as soon as this segments are ordered in their order of appearance in the chunk; and, bitrate estimation means for re-estimating the bitrate of each CDN based on performances of reception of the segments.

In a third aspect of the invention, the invention concerns a system for streaming an audio video content comprising a plurality of content delivery networks and a device according to the aforementioned second aspect.

In a fourth aspect of the invention, the invention concerns a computer program comprising program code instructions which can be loaded in a programmable device for implementing the method according to the first aspect, when the program code instructions are run by the programmable device.

In a fifth aspect of the invention, the invention concerns an information storage means storing a computer program comprising program code instructions which can be loaded in a programmable device for implementing the method according to the first aspect, when the program code instructions are run by the programmable device.

LIST OF FIGURES

The characteristics of the present invention mentioned above, as well as other characteristics will appear more clearly on reading the following description of an example of an embodiment, said description being done in relation with the joint drawings, among which.

DETAILED DESCRIPTION

The description below describes embodiments of the invention focusing on a system comprising a client device connected by a network to a plurality of CDN comprising three CDN. This system uses an HLS based ABR solution to stream contents to the client device. Nevertheless, this invention is adapted to systems comprising more CDN and using other ABR approaches such as MPEG DASH or Smooth Streaming. In addition, the invention can be adapted to CDN providing multiple-connections. Moreover, the invention is adapted to the peer to peer context, wherein CDN can be replaced by or coexist with peers such as personal computers, mobile phones, tablets, etc.

Figure 1:
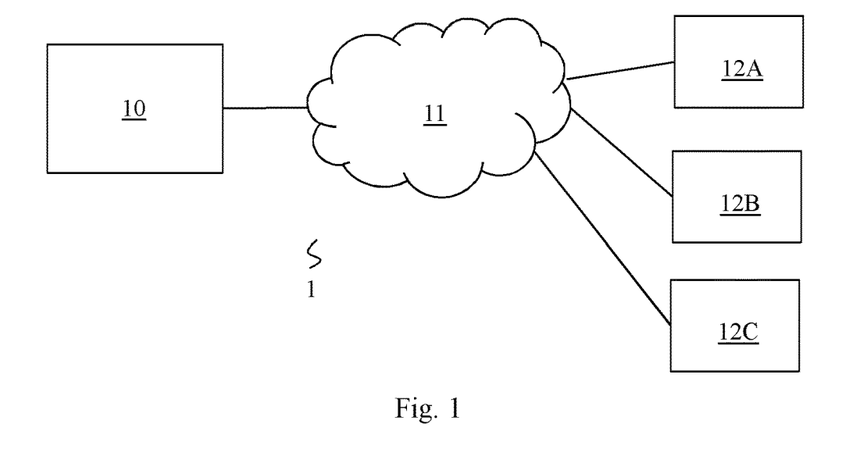
FIG. 1 illustrates schematically an example of system in which the invention could be implemented.

FIG. 1 illustrates schematically an example of system in which the invention could be implemented.

In FIG. 1, a system 1 comprises a client device 10 connected to a WAN (Wide Area Network) 11 such as the Internet. A plurality of CDN 12A, 12B and 12C are also connected to the WAN, which allows the client device 10 to request contents to at least one of these CDN. We suppose here that the client device 10 implements a multi-CDN approach. Consequently, when the client device 10 wishes to receive a content, it requests this content to each CDN of the system 1. Each CDN comprises at least one content in a plurality of versions, each version representing that content at a different bitrate. When the client device 10 wishes to receive a content, it requests a same version of said content to each CDN of the system 1 according to a method described in the following in relation with FIG. 4.

Figure 2:
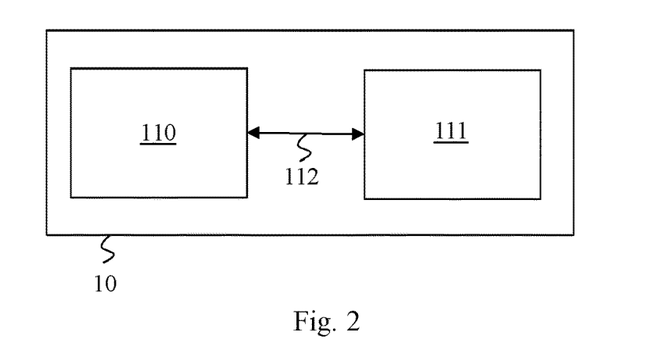
FIG. 2 illustrates schematically an example of client device implementing the invention.

FIG. 2 illustrates schematically an example of client device implementing the invention.

FIG. 2 represents for instance the client device 10 of FIG. 1. Client 10 comprises an Audio Video Player (AV player) 110 and a processing module 111 called diversity module.

The main purpose of the AV player 110 is to decode contents so that these contents can be displayed on a display device (not represented) to a user. The AV player 110 is also capable of determining its operating conditions allowing the AV player 110 determining a version of said content to be requested. Information representative of the operating conditions of the AV player 110 may comprise a CPU usage in the AV player 110, a screen size of the display device, a frame rate and network conditions. Network conditions comprise the bitrate at which the AV player 110 receives the requested version of the content.

Figure 4:
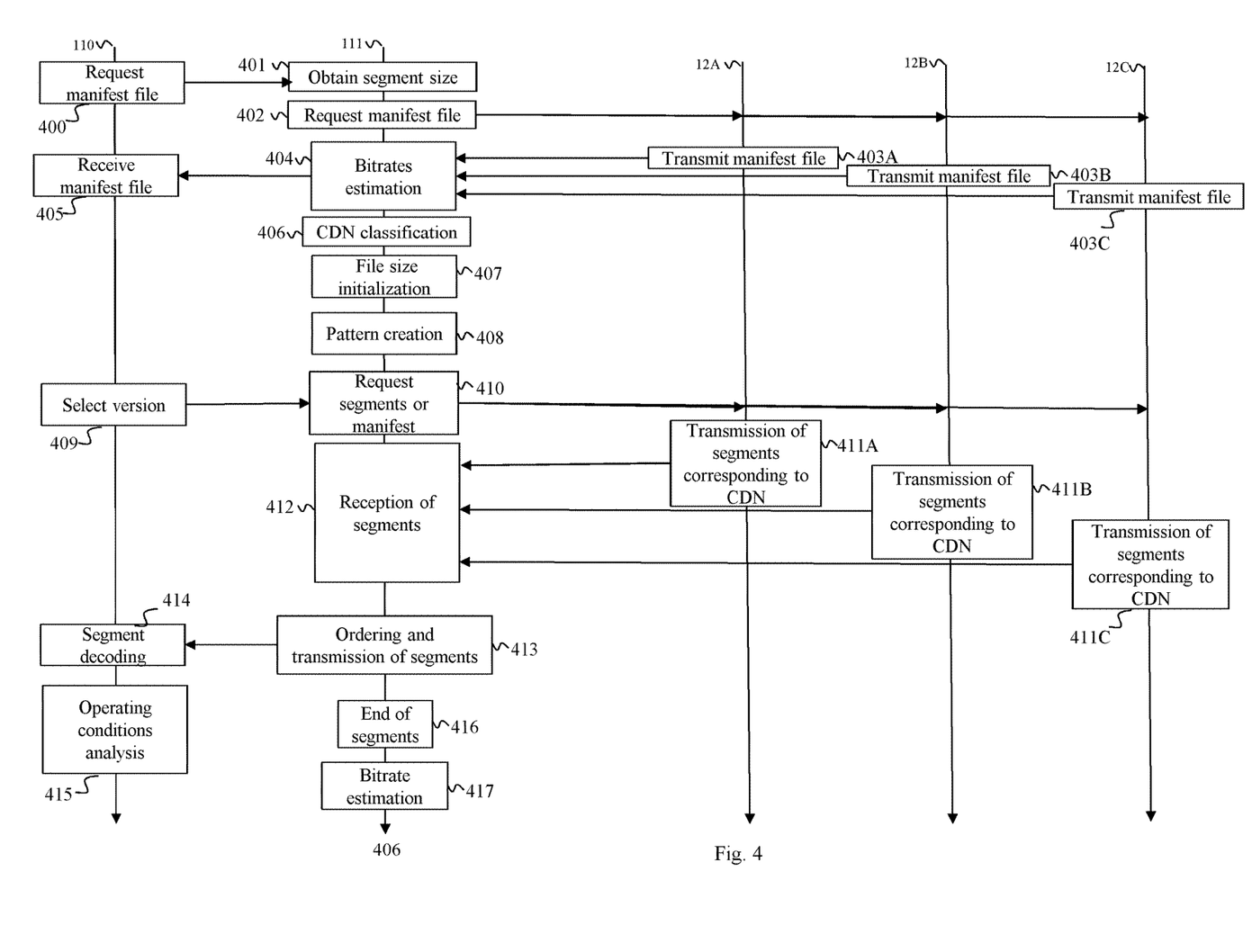
FIG. 4 illustrates schematically an example of implementation of the invention in the context of the system of FIG. 1.

The main purpose of the diversity module 111 is to request the version of the content selected by the AV video player 110 to a plurality of CDN (here CDN 12A, 12B and 12C) using a multi-CDN approach described in relation with FIG. 4. The diversity module 111 then receives said version, reorder received data corresponding to said version if necessary and on the fly, forwards these received data to the AV player 110 without waiting the entire reception of the version.

In the embodiment of the client device 10 described in FIG. 2, the AV player 110 and the diversity module 111 are comprised in a same device, i.e. the client device 10. In another embodiment, the AV player 110 and the diversity module 111 could be in independent devices connected by a network. For instance, the diversity module 111 could be comprised in an interconnection device such as a gateway and the AV player 110 could be comprised in a TV set.

Figure 3:
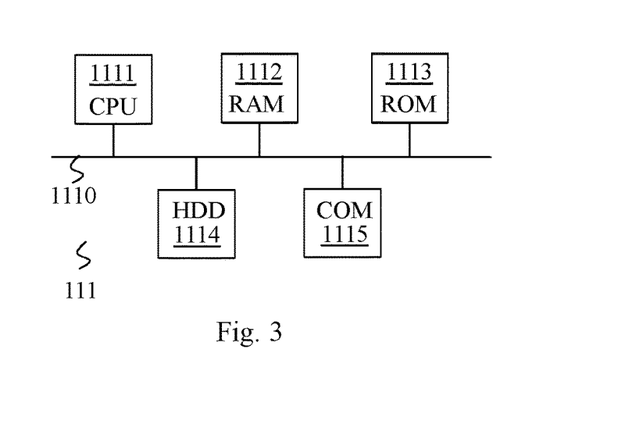
FIG. 3 illustrates schematically an example of a hardware architecture of a processing module.

FIG. 3 illustrates schematically an example of a hardware architecture of the diversity module 111. According to the shown architecture, the diversity module 111 comprises the following components interconnected by a communications bus 1110: a processor, microprocessor, microcontroller or CPU (Central Processing Unit) 1111; a RAM (Random Access Memory) 1112; a ROM (Read-Only Memory) 1113; storage means such as a HDD (Hard-Disk Drive) 1114, or any other device adapted to read information stored by storage means; and a communication interface 1115.

The communication interface 1115 allows the processing unit 1111 to receive the requested version of the content from the CDN and to transmit reordered data corresponding to said version to the AV player 110. When the AV player 110 and the diversity module 111 are comprised in the client device 10, a communication bus 112 interconnects the AV player 110 and the diversity module 111. This communication bus allows the diversity module 111 transmitting the requested version to the AV player 110 and the AV player 110 transmitting requests for receiving a given version of a given content to the diversity module 111.

CPU 1111 is capable of executing instructions loaded into RAM 1112 from ROM 1113 or from an external memory, such as an SD card or the HDD 1114. After the diversity module 111 has been powered on, CPU 1111 is capable of reading instructions from RAM 1112 and executing these instructions. The instructions form one computer program that causes CPU 1111 to execute the method described in FIGS. 4, 5 and 6.

Figure 5:
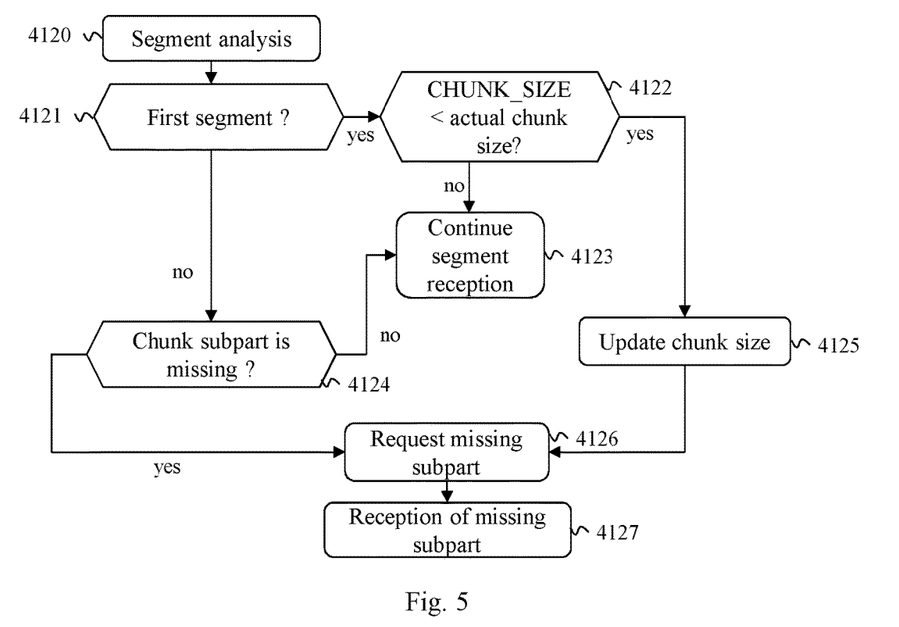
FIG. 5 illustrates schematically a first detailed view of a step of the method of FIG. 4.
Figure 6:
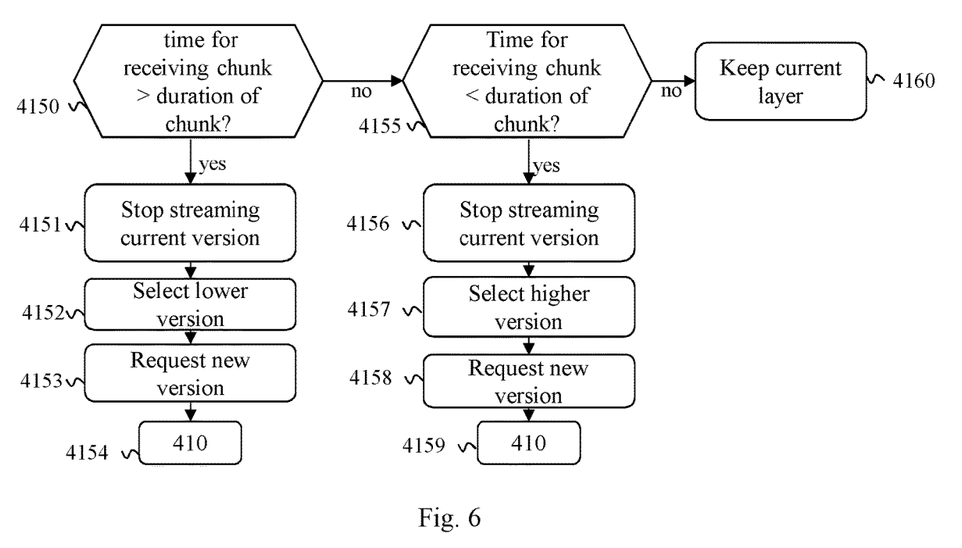
FIG. 6 illustrates schematically a second detailed view of a step of the method of FIG. 4.

The execution of the method described in FIGS. 4, 5 and 6 may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

FIG. 4 illustrates schematically an example of implementation of the invention in the context of the system 1 of FIG. 1.

In FIG. 4, steps implemented by the AV player 110, the diversity module 111 and the CDN 12A, 12B and 12C are represented on vertical timelines.

Since system 1 uses HLS as the ABR streaming technique, each version of a content is formed of a succession of files called chunks, each chunk being requested using an HTTP request. However, as described in the following, in the invention, chunks are considered as a set of segments that can be requested independently.

In a step 400, the AV player 110 selects a content and transmits a request for obtaining a manifest file corresponding to said content to the diversity module 111. In HLS, the manifest file comprises a global manifest file describing all versions of the content and for each version, a sub-manifest file describing all segments constituting the version. In step 400, only the global manifest file is requested.

In a step 401, the diversity module 111 receives the request for the manifest file. During step 401, the diversity module 111 obtains a predefined segment size SEGMENT_SIZE. In an embodiment, the predefined segment size SEGMENT_SIZE has been obtained experimentally in order to be consistent with a plurality of constraints comprising:

The predefined segment size SEGMENT_SIZE should be big enough to be accepted by any CDN and to not decrease the CDN efficiency. Indeed, a CDN which is requested a small portion of a file may answer by transmitting the complete file instead of the requested portion.

The predefined segment size SEGMENT_SIZE should be big enough to allow an accurate bitrate estimation by the AV player 110.

In an embodiment the predefined segment size SEGMENT_SIZE is fixed to "2048" bytes.

In a step 402, the diversity module 111 requests the manifest file to CDN 12A, 12B and 12C.

In steps 403A, 403B and 403C, respectively CDN 12A, 12B and 12C answer to the request by transmitting the requested manifest file.

In a step 404, the diversity module 111 receives the manifest files and estimates the bitrate of each CDN based on performances of reception of the manifest files. As mentioned above, HTTP based streaming solutions, such as HLS, rely on TCP connections. At the start-up of a streaming session between a CDN and a client device, very few data are available to estimate a bitrate between the CDN and the client device. One solution consists in deriving an estimation of said bitrate from an estimation of a TCP window size of the TCP connection implemented between the client device and the CDN and from the response time of the CDN for transmitting the manifest file. Accordingly, the bitrate $BR_{CDN_i}$ between the client device 10 and the $CDN_i$, with i corresponding to the references 12A, 12B or 12C, can be computed as follows:

$$BR_{CDN_i} = TCP\_WINDOW\_SIZE_i / RESPONSE\_TIME_i$$

where $TCP\_WINDOW\_SIZE_i$ represents the average size of the TCP window of the TCP connection implemented between the client device 10 and the CDN i, $RESPONSE\_TIME_i$ represents the response time of the CDN i for transmitting the manifest file.

During step 404, the diversity module 111 transmits one of the received manifest file to the AV player 110. In an embodiment, the manifest file received first is transmitted to the AV player 110.

In a step 405, the manifest file is received by the AV player 110.

In a step 406, the CDN 12A, 12B and 12C are classified in order of decreasing estimated bitrate. If, for instance, $BR_{CDN_{12A}} > BR_{CDN_{12B}} > BR_{CDN_{12C}}$, CDN 12A appears in first position in the classification, followed by CDN 12B and then CDN 12C.

After having determined the bitrate of each CDN and having classified these CDN, steps 407 to 417, allowing the streaming of a chunk of a version of the content, are executed by the AV player 110, the diversity module 111 and the CDN 12A, 12B and 12C.

At this stage of the execution of the method of FIG. 4, the diversity module 111 (but also the client device 10 in general), doesn't know the size of a chunk nor the version of the content to be requested. However, as will be described in the following, at least rough features of a typical chunk (i.e. the size) are needed to allow the diversity module 111 to share the requesting of segments composing a chunk between CDN 12A, 12B and 12C. Consequently, during steps 407 and 408, the diversity module 111 defines a default chunk for this purpose. The default chunk is representative of chunks of the content, i.e. the default chunk has features in average close to the features of the chunks of the content.

In step 407, the size of the default chunk chunk_size is given a predefined default size CHUNK_SIZE obtained experimentally.

chunk_size=CHUNK_SIZE

This predefined default size CHUNK_SIZE is sufficiently high to be higher than any known chunk size but also sufficiently close to an actual chunk size.

In step 408, the diversity module 111 defines a subdivision of the default chunk in a succession of groups of segments of the predefined segment size SEGMENT_SIZE. Each group of segments is organized according to a pattern of segments. The pattern of segments comprises a number of segments NB_SEGMENTS depending of a predetermined minimum chunk size MIN_CHUNK_SIZE and a predetermined number NB_ESTIMATION representative of a minimum time the AV player estimates its operating conditions on a chunk.

The predetermined minimum chunk size MIN_CHUNK_SIZE is obtained experimentally and is for example equal to "125" Kbytes.

The predetermined number NB_ESTIMATION is also obtained experimentally by observing the number of times a representative set of AV players estimates a bitrate during a chunk. For example the predetermined number NB_ESTIMATION is equal to "3".

Using these predefined values, the number of segments NB_SEGMENTS in a pattern is computed as follows:

$$NB\_SEGMENTS = \frac{MIN\_CHUNK\_SIZE}{SEGMENT\_SIZE \times NB\_ESTIMATION}$$

By replacing the different variables by their values and by rounding the result to the closest higher integer value, we obtain:

NB_SEGMENTS=21

Consequently, the default chunk is supposed to be divided in a succession of consecutive groups of segments, each group comprising NB_SEGMENTS segments.

Figure 7:
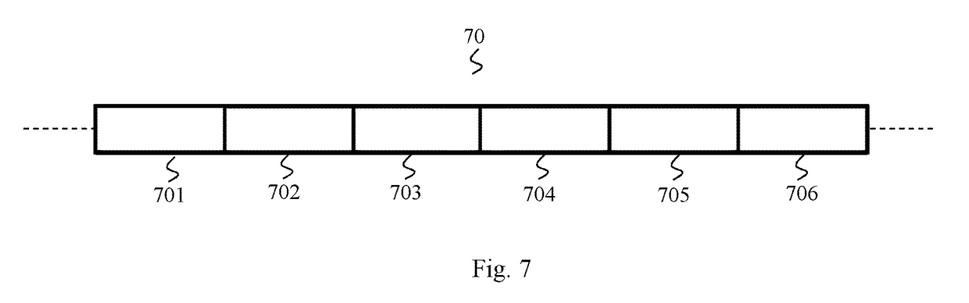
FIG. 7 illustrates schematically a subpart of a file subdivided in a succession of groups of segments.

FIG. 7 illustrates schematically a subpart of the default chunk subdivided in a succession of consecutive groups of segments. "6" groups of segments (701 to 706) are represented.

Each pattern comprises a set of consecutive segments for each CDN. Each set comprises a number of segments proportional to the bitrate estimated for the CDN to which it corresponds. In addition, the sets in the pattern are ordered according to the classification of the CDN obtained in step 406.

Figure 8:
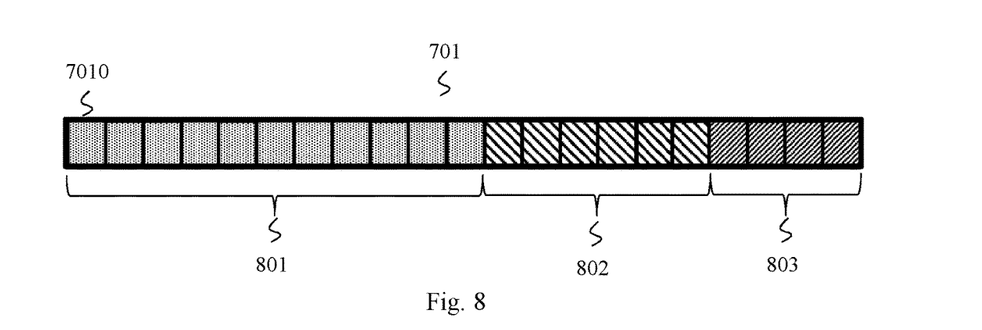
FIG. 8 illustrates schematically an organization of a group of segments according to a pattern of segments; and, FIG. 9 illustrates an estimation of network conditions.

FIG. 8 illustrates schematically an organization of the group of segments 701 according to a pattern of segments. In the example of FIG. 8, the pattern comprises "21" segments. Segment 7010 is one of the segments of the group of segments 701. We suppose that the estimated bitrates for CDN 12A, 12B and 12C are respectively "5" Mbit/s, "3" Mbits/s and "2" Mbits/s. Consequently, for a total of "10" Mbits/s delivered by the plurality of CDN, CDN 12A delivers "50%" of the total bitrate, CDN 12B delivers "30%" of the total bitrate and CDN 12C delivers "20%" of the total bitrate. Accordingly, the pattern comprises a first set of segments 801 comprising "50%" of segments of the pattern, a second set of segments 802 comprising "30%" of segments of the pattern and a third set of segments 803 comprising "20%" of segments of the pattern. Segments of the first set 801 are intended to be requested to CDN 12A. Segments of the second set 802 are intended to be requested to CDN 12B. Segments of the third set 803 are intended to be requested to CDN 12C. All groups of segments of the default chunk are supposed to follow the structure of the pattern represented in FIG. 8.

In a step 409, after having analyzed the manifest file and determined which version of the content described in this manifest file is compliant with its operating conditions the AV player 110 requests either a sub manifest file or a chunk corresponding to said version. Several cases are possible here. If the content is a live content, generally the requests of the AV player are a succession of request for a sub-manifest file followed by a request for a chunk. If the content is a video on demand (VoD), only one sub-manifest file is requested followed by a plurality of requests for segments until the AV player 110 modifies the requested version. Note that, at the start of a streaming session, since the AV player 110 has no information on its operating conditions, in general it chooses the lowest version described in the manifest file.

In step 410, the request of the AV player is intercepted by the diversity module 111. If the request is a request for a sub-manifest file, said request is transmitted to the CDN offering the highest bitrate. If the request concerns a chunk, said chunk, called requested chunk, is requested to CDN 12A, 12B and 12C. It is supposed here that the requested chunk has the same features (i.e. size, structure in groups of segments) than the default chunk. To do so, for each CDN, the diversity module 111 transmits a request to the CDN (i.e. one request per CDN) requesting all segments of the requested chunk allocated to said CDN as defined in each groups of segments by the pattern. Each segment of a requested chunk is requested in the form of byte ranges, a byte range being a portion of the requested chunk identified by a start position and an end position, each position being expressed in bytes. For instance, since each group of segments of the default chunk have the same structure of segments defined by the pattern, one request requesting each first set of segments 801 of the requested chunk is transmitted to CDN 12A, one request requesting each second set of segments 802 of the requested chunk is transmitted to CDN 12B, and one request requesting each third set of segments 803 of the requested chunk is transmitted to CDN 12C.

In step 411A (respectively 411B and 411C if needed), CDN 12A (respectively CDN 12B and CDN 12C if needed), answers to the request it receives either by transmitting the requested sub-manifest file or by extracting the byte ranges corresponding to the segments from the requested chunk and by transmitting the extracted segments in their order of appearance in the requested chunk.

In step 412, the diversity module 111 receives the segments. Further details of step 412 are provided in the following in relation with FIG. 5.

Since segments are transmitted simultaneously by the CDN 12A, 12B and 12C, the segments are received more or less disordered. A reordering of the segments in the correct order is therefore performed during step 413 before transmission of the segments to the AV player 110. The segments are transmitted as soon as they are ordered to the AV player 110.

Even if in FIG. 4 steps 412 and 413 are represented sequentially, in reality, these steps are imbricated. Indeed, the reception of segments, the reordering and the transmission to the AV player 110 are performed on the fly, while receiving the segments. The diversity module 111 doesn't wait receiving all segments before transmitting the segments to the AV player 110.

In step 414, the AV player 110 receives and decodes the segments.

In step 415, the AV player 110 performs an analysis of its operating conditions. At this step the AV player may decide to keep the current version or to request a different version. Even if steps 414 and 415 are represented as successive steps, in reality these steps are executed simultaneously, the analysis of the operating conditions being performed all along the reception and decoding of the segments. Further details of step 415 are provided in the following in relation with FIG. 6.

In step 416, the diversity module 111 determines that the last segment of the requested chunk is received.

In a step 417, the diversity module 111 uses the reception bitrate of the segments of the requested chunk to determine the bitrate of each CDN (i.e. the bitrates $BR_{CDN_{12A}}$, $BR_{CDN_{12B}}$, $BR_{CDN_{12C}}$ in the example of FIG. 1).

Step 417 is followed by step 406 already explained.

Dividing the chunks in groups of segments which are subdivided in segments, the number of segments in a group depending of the bitrate of the CDN to which this group is to be requested, allows smoothing the variations of the reception bitrate from the point of view of the AV player 110. Indeed, even if it doesn't allow to prevent the occurrence of bursts, these bursts are lower, shorter and spread over the chunk. In that case, the periods of estimation of the bitrate, as represented in FIG. 9, include several periods of burst followed by periods of low bitrate. The estimated bitrate is consequently an average bitrate estimated on these periods which suffers less of variations of the bitrate as in the example of FIG. 9. There is less risk of overestimation or underestimation of the bitrate by the AV player 110.

FIG. 5 illustrates schematically a detailed view of step 412 of FIG. 4.

The process described in FIG. 5 is performed each time the diversity module 111 receives a segment from one of the CDN 12A, 12B and 12C.

Each segment received by the diversity module 111 comprises an information representative of the actual size of the requested chunk. Consequently, while at step 407, the actual size of the chunk to be requested is not known precisely, as soon as a segment of the requested chunk is received by the diversity module 111, the diversity module 111 is capable of retrieving the actual size of the requested chunk.

In a step 4120, the diversity module 111 analyzes a received segment.

In a step 4121, the diversity module 111 determines if the received segment is the first segment of the requested chunk.

If yes, in a step 4122, the diversity module 111 extracts the information representative of the actual chunk size from the segment, and compares the actual chunk size to the predefined default size CHUNK_SIZE.

If the actual chunk size is higher than the predefined default size CHUNK_SIZE, the diversity module 111 updates the value of the predefined default size CHUNK_SIZE with the actual chunk size during a step 4125.

Then, in a step 4126, the diversity module 111 determines that, since when it defines the subdivision of the default chunk in a succession of groups of segments it considers a chunk size equal to an underestimated predefined default size CHUNK_SIZE, said subdivision misses a subpart of the requested chunk at the end of the requested chunk. Consequently, the requests transmitted in step 410 don't allow to request completely the requested chunk but only a subpart. The missing subpart of the requested chunk, corresponding here to a part of the requested chunk not comprised in a default chunk of a size equal to the underestimated predefined default size CHUNK_SIZE, is then requested to at least one of the CDN 12A, 12B and 12C in the step 4126.

In an embodiment, the missing subpart is requested to the CDN in first position in the classification of CDN. In the example of the system of FIG. 1, one request comprising byte ranges corresponding to segments of size SEGMENT_SIZE covering the missing subpart of the requested chunk is transmitted to CDN 12A.

In an embodiment, the missing subpart is requested to each CDN 12A, 12B and 12C by applying to the missing subpart the subdivision in groups of segments defined in step 408. In each group of segments of the missing subpart, segments of the first set 801 of the pattern are requested to CDN 12A, segments of the second set 802 of the pattern are requested to CDN 12B and segments of the third set 803 of the pattern are requested to CDN 12C.

In a step 4127, the segments corresponding to the missing subpart are received by the diversity module 111. Steps 413 to 417 are then applied to these segments.

If at step 4122, the actual chunk size is lower than the predefined default size CHUNK_SIZE, in a step 4123, the process described in FIG. 5 ends until the reception of a new segment.

If at step 4121, the received segment is not the first segment of the requested chunk, the diversity module 111 verifies in a step 4124 that no subpart of the requested chunk is missing which can indicate that at least one of the CDN is suffering of a malfunction. In an embodiment, a subpart of the requested chunk is considered to be missing when, for one of the CDN, a difference between a current time and a time at which the diversity module 111 receives a last segment from this CDN is above a predefined threshold.

In another embodiment, a subpart is considered to be missing if after reordering segments received from each CDN and checking the byte ranges of the received segments, it appears that some byte ranges are missing.

If no subpart is missing, the diversity module 111 executes step 4123. Otherwise, if a subpart of the requested chunk is missing, the CDN identified as suffering of a malfunction is removed from the CDN considered for streaming the requested chunk. In addition, the missing segments are requested during step 4126 to one of the remaining CDN. In an embodiment, the missing segments are requested to the remaining CDN offering the highest bitrate. If for example, the CDN suffering of a malfunction, is CDN 12A, missing segments are requested to CDN 12B. Step 4126 is followed by step 4127 already explained.

FIG. 6 illustrates schematically a detailed view of step 415 of the method of FIG. 4.

In step 415, the AV player 110 analyzes its operating conditions in order to determine if the version of the content it is requesting is consistent with its operating conditions or if it needs to request another version.

The process of FIG. 6 focuses more particularly on one operating condition representative of a time for receiving a chunk but in another embodiment, other operating conditions could also be observed.

A chunk should be received in a time approximately equal to the time this chunk should be played by the AV player 110 (i.e. for instance the duration of an image). In that case, there is no reason to request another version than the version currently requested. The version currently requested is adapted to the operating conditions. If the time between the request of a chunk and the reception of said chunk is significantly lower than the duration of the data represented by this chunk, it can be deduced that the AV player 110 can request a higher version. If the time between the request of a chunk and the reception of said chunk is significantly higher than the duration of the data represented by this chunk, it can be deduced that the AV player 110 can request a lower version.

In a step 4150, the AV player 110 determines, for the last chunk received, if the time between the request of the chunk and the reception of said chunk is significantly higher than the duration of the data represented by this chunk.

If yes, the AV player 110 requests a stop of the current version streaming to each CDN in a step 4151.

In a step 4152, the AV player 110 selects a version with a lower bitrate.

In a step 4153, the selected version is requested by the AV player 110.

The diversity module 111 receives the request for the new version in step 410 and resume the execution of the method described in relation with FIG. 4 from step 410.

If the time between the request of the chunk and the reception of said chunk is not significantly higher than the duration of the data represented by this chunk, the AV player 110 determines if the time between the request of the chunk and the reception of said chunk is significantly lower than the duration of the data represented by this chunk in step 4155.

If yes, the AV player 110 requests a stop of the current version streaming to each CDN in a step 4156.

In a step 4157, the AV player 110 selects a version with a higher bitrate.

In a step 4158, the selected version is requested by the AV player 110.

The diversity module 111 receives the request for the new version in step 410 and resumes the execution of the method described in relation with FIG. 4 from step 402.

If the time between the request of the chunk and the reception of said chunk is approximately equal to the duration of the data represented by this chunk, the AV player 110 considers in a step 4160 that the version being streamed is adapted to its operating conditions and continues the execution of the method of FIG. 4 with this version.

The invention claimed is:

1. A method for streaming an audio video content, called content, to a client device comprising an audio video player, called AV player, in charge of decoding said content and capable of determining its operating conditions allowing the AV player to determine a version of said content to be requested adapted to said operating conditions among a plurality of versions, said content being stored redundantly on a plurality of content delivery networks, called CDN, from which said content could be requested in the form of a sequence of successive independent files, called chunks, using HTTP requests, the method being implemented by a device interfacing the AV player with the plurality of CDN, wherein the method comprises:

receiving, from the AV player, a request for a first manifest file describing said content;
requesting the first manifest file to each CDN;
estimating bitrate of each CDN based on performances of reception of the first manifest file from each CDN and transmitting one of the received first manifest file to the AV player;
classifying the CDN in order of decreasing estimated bitrates;
defining a subdivision of a default chunk of said content of a predefined chunk size in a succession of groups of segments of a predefined segment size, each group of segments being organized according to a pattern of segments comprising a number of segments depending on a predetermined minimum chunk size and a predetermined number representative of a minimum time the AV player estimates its operating conditions on a chunk, the pattern comprises a set of consecutive segments for each CDN of the plurality of CDN, each set of consecutive segments comprising a number of segments proportional to the bitrate estimated for the CDN to which it corresponds and each segment of each set of consecutive segments being intended to be requested to the CDN to which the set of consecutive segments corresponds, the sets of consecutive segments in the pattern being ordered according to the classification of the CDN;
intercepting a request from the AV player and if the request concerns a chunk corresponding to a version of the content determined by the AV player using the first manifest file, transmitting a request to each CDN, the request transmitted to a CDN requesting all segments allocated to said CDN as defined in each group of segments of the default chunk by the pattern;
receiving said segments and transmitting them to the AV player as soon as these segments are ordered in their order of appearance in the chunk;
re-estimating the bitrate of each CDN based on performances of reception of the segments; and
resuming the method from the classifying of the CDN while chunks remain to be requested for said content, the classifying being based on the last estimation of the bitrate of each CDN.

2. The method according to claim 1, wherein, during the reception of each chunk, at least one segment of said chunk is analyzed to extract data representative of an actual chunk size of said chunk and, if the actual chunk size is higher than the predefined chunk size, reinitializing the predefined chunk size to the actual chunk size and requesting missing segments corresponding to a part not comprised in the predefined chunk size to the CDN offering the maximum bitrate.

3. The method according to claim 2, wherein the analyzed segment is the first received segment for that chunk.

4. The method according to claim 1, wherein during the reception of each chunk, at least one segment of said chunk is analyzed to determine if at least one segment has not been received, and if at least one segment has not been received, each missing segment is requested to the available CDN offering the maximum bitrate.

5. The method according to claim 1, wherein when the request intercepted by the AV player concerns a second manifest file corresponding to a version of the content determined by the AV player using the first manifest file, transmitting a request to the CDN offering the highest bitrate to obtain said second manifest file, said second manifest file being sent to the AV player when received to allow the AV player to request at least one new chunk.

6. A device intended to be used in a context for streaming an audio video content, called content, to a client device comprising an audio video player, called AV player, in charge of decoding said content and capable of determining its operating conditions allowing the AV player to determine a version of said content to be requested adapted to said operating conditions among a plurality of versions, said content being stored redundantly on a plurality of content delivery networks, called CDN, from which said content could be requested in the form of a sequence of successive independent files, called chunks, using HTTP requests, wherein the device comprises electronic circuitry configured for:

receiving, from the AV player, a request for a manifest file describing said content;

requesting the manifest file to each CDN;

estimating bitrate of each CDN based on performances of reception of the manifest files and transmitting one of the received manifest file to the AV player;

classifying the CDN in order of decreasing estimated bitrates;

defining a subdivision of a default chunk of said content of a predefined chunk size in a succession of groups of segments of a predefined segment size, each group of segments being organized according to a pattern of segments comprising a number of segments depending of a predetermined minimum chunk size and a predetermined number representative of a minimum time the AV player estimates its operating conditions on a chunk, the pattern comprises a set of consecutive segments for each CDN of the plurality of CDN, each set of consecutive segments comprising a number of segments proportional to the bitrate estimated for the CDN to which it corresponds and each segment of each set of consecutive segments being intended to be requested to the CDN to which the set of consecutive segments corresponds, the sets of consecutive segments in the pattern being ordered according to the classification of the CDN;

intercepting a request from the AV player;

transmitting a request to each CDN if the intercepted request concerns a chunk corresponding to a version of the content determined by the AV player using the manifest file, the request transmitted to a CDN requesting all segments allocated to said CDN as defined in each group of segments of the default chunk by the pattern;

receiving said segments;

transmitting the received segments to the AV player as soon as these segments are ordered in their order of appearance in the chunk; and, re-estimating the bitrate of each CDN based on performances of reception of the segments.

7. A system for streaming an audio video content, wherein the system comprises a plurality of content delivery networks, called CDN, and a device according to claim 6.

8. Non-transitory information storage medium storing a computer program comprising program code instructions which can be loaded in a programmable device for implementing the method according to claim 1, when the program code instructions are read from the non-transitory information storage medium and run by the programmable device.

* * * * *